(12) United States Patent
Akita et al.

(10) Patent No.: US 8,773,081 B2
(45) Date of Patent: Jul. 8, 2014

(54) CONTROLLER FOR CONTROLLING POWER GENERATOR DRIVEN BY ROTATIONAL POWER OF ENGINE

(75) Inventors: Kouichi Akita, Chiryu (JP); Takahiko Tashiro, Kariya (JP)

(73) Assignee: Denso Corporation, Kariya (JP)

( * ) Notice: Subject to any disclaimer, the term of this patent is extended or adjusted under 35 U.S.C. 154(b) by 317 days.

(21) Appl. No.: 13/323,045

(22) Filed: Dec. 12, 2011

(65) Prior Publication Data
US 2012/0146593 A1 Jun. 14, 2012

(30) Foreign Application Priority Data
Dec. 10, 2010 (JP) .................................. 2010-275928

(51) Int. Cl.
H02H 7/06 (2006.01)
(52) U.S. Cl.
USPC .............................................. 322/28; 322/22
(58) Field of Classification Search
USPC ..................................... 322/21, 22, 27, 28, 59
See application file for complete search history.

(56) References Cited

U.S. PATENT DOCUMENTS

| | | | |
|---|---|---|---|
| 5,880,577 | A | 3/1999 | Aoyama et al. |
| 7,750,602 | B2 | 7/2010 | Asada |
| 8,138,728 | B2 | 3/2012 | Uematsu |
| 8,541,988 | B2 * | 9/2013 | Horihata et al. ............... 322/21 |
| 2003/0042809 | A1 | 3/2003 | Taniguchi et al. |

FOREIGN PATENT DOCUMENTS

| | | |
|---|---|---|
| CN | 1146651 A | 4/1997 |
| CN | 100533846 C | 8/2009 |
| CN | 101552587 A | 10/2009 |
| JP | A-61-171879 | 8/1986 |
| JP | A-6-276799 | 9/1994 |
| JP | A-9-9695 | 1/1997 |
| JP | A-2000-50523 | 2/2000 |
| JP | A-2003-079198 | 3/2003 |
| JP | A-2007-015477 | 1/2007 |
| JP | A-2009-254043 | 10/2009 |

OTHER PUBLICATIONS

Decision of Rejection issued in Japanese Patent Application No. 2010-275928 dated Jan. 15, 2013 (with translation).
Office Action issued in Japanese Patent Application No. 2010-275928 dated Jun. 11, 2013 (with translation).
Official Communication issued in Japanese Patent Application No. 2010-275982 dated Oct. 19, 2012 (with translation).
Office Action issued in Chinese Patent Application No. 201110409983.0 dated Dec. 25, 2013 (with translation).

\* cited by examiner

Primary Examiner — Nicholas Ponomarenko
(74) Attorney, Agent, or Firm — Oliff PLC

(57) ABSTRACT

In a controller, a voltage controller operates, in an initial excitation mode, to turn selectively on and off a switch to supply an excitation current as an initial excitation current to the field winding, and operates, in a power generation mode, to selectively increase and reduce the excitation current to be supplied to the field winding to regulate an output voltage of the power generator to a target value. A mode-shift determiner determines, while the voltage controller operates in the initial excitation mode, whether to shift an operation mode of the voltage controller from the initial excitation mode to the power generation mode based on: a measured rotation number of a rotor, a threshold rotation number of the rotor, and a preset time period, the time period being equal to or longer than an expected maximum value of cycle of pulsations of rotation of the engine.

14 Claims, 13 Drawing Sheets

CONTROLLER FOR CONTROLLING POWER GENERATOR DRIVEN BY ROTATIONAL POWER OF ENGINE

CROSS REFERENCE TO RELATED APPLICATIONS

This application is based on Japanese Patent Application 2010-275928 filed on Dec. 10, 2010. This application claims the benefit of priority from the Japanese Patent Application, so that the descriptions of which are all incorporated herein by reference.

TECHNICAL FIELD

The present disclosure relates to controllers for controlling power generators installed in motor vehicles; these generators are driven by rotational power supplied from an engine.

BACKGROUND

In a normal power generator installed in a motor vehicle, when a field winding of the power generator is intermittently energized by a voltage regulator while a rotor of the power generator is rotated by rotational power supplied from the internal combustion engine (engine) of the motor vehicle, the rotating field winding creates magnetic flux. The created magnetic flux magnetizes a plurality of field poles of the rotor. The rotation of the plurality of magnetized field poles creates magnetic flux, and the created magnetic flux induces a multiphase AC voltage in multiphase armature windings. The multiphase AC voltage induced in the multiphase armature windings is rectified by a rectifier, so that a direct current (DC) voltage is generated.

A particular type of such power generators is disclosed in US Patent Application Publication No. 2003/0042809 corresponding to Japanese Patent Application Publication No. 2003-79198. A three-phase alternator disclosed in the Patent Publication is configured to compare an AC voltage induced in one phase winding with a threshold voltage level to thereby generate pulses, and start to generate power by starting an excitation current to the field winding when the number of pulses is equal to or higher than a predetermined number.

SUMMARY

During cold starting, large engine-speed pulsations occur due to ignition of an engine. Thus, even if an actual engine speed, such as an actual average engine speed, is low, the three-phase alternator disclosed in the Patent Publication may start to generate power because the number of pulses due to higher pulsations in rotation of the engine may be equal to or higher than the predetermined number. Once the three-phase alternator generates power, torque required for the three-phase alternator to generate power may be added although the actual engine speed is low. The increase in the torque may further reduce the engine speed, resulting in a deterioration of the startability of the engine. This deterioration in the engine may cause the engine to stall.

In view of the circumstances set forth above, one aspect of the present disclosure seeks to provide controllers for controlling a power generator; these controllers are designed to address at least one of the problems set forth above.

Specifically, an alternative aspect of the present disclosure aims to provide such controllers capable of improving the startability of an engine even if there are higher pulsations in rotation of the engine.

According to a first exemplary aspect of the present disclosure, there is provided a controller for controlling a power generator including: a rotor with a field winding; and at least one-phase stator winding, the rotor being rotatable by rotational power supplied from an engine. The controller includes a switch connected with the field winding, and a voltage controller configured to operate, in an initial excitation mode, to turn selectively on and off the switch to supply an excitation current as an initial excitation current to the field winding, and operate, in a power generation mode, to selectively increase and reduce the excitation current to be supplied to the field winding to regulate an output voltage of the power generator to a target value. The controller includes a rotation-number measuring unit configured to measure a rotation number of the rotor based on a phase voltage induced in the at least one-phase winding, and a mode-shift determiner. The mode-shift determiner is configured to, while the voltage controller operates in the initial excitation mode, determine whether to shift an operation mode of the voltage controller from the initial excitation mode to the power generation mode based on a relationship between the measured rotation number of the rotor, a threshold rotation number of the rotor, and a preset time period, the time period being equal to or longer than an expected maximum value of cycle of pulsations of rotation of the engine.

With the configuration of the controller according to the first exemplary aspect of the present disclosure, the mode-shift determiner can determine whether to shift the operation mode of the voltage controller from the initial excitation mode to the power generation mode based on: the measured rotation number of the rotor, a threshold rotation number of the rotor, and the preset time period, which is equal to or longer than the expected maximum value of cycle of pulsations of rotation of the engine.

This configuration can determine that the measured rotation number of the rotor is reliably equal to or higher than the threshold rotation number. Thus, even if there are great pulsations of rotation of the engine, it is possible to shift the operation mode of the voltage controller from the initial excitation mode to the power generation mode after the measured rotation number of the rotor has been reliably equal to or higher than the threshold rotation number. This prevents a speed of the engine from dropping due to an increase of torque required for the power generation mode, thus improving the startability of the engine.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
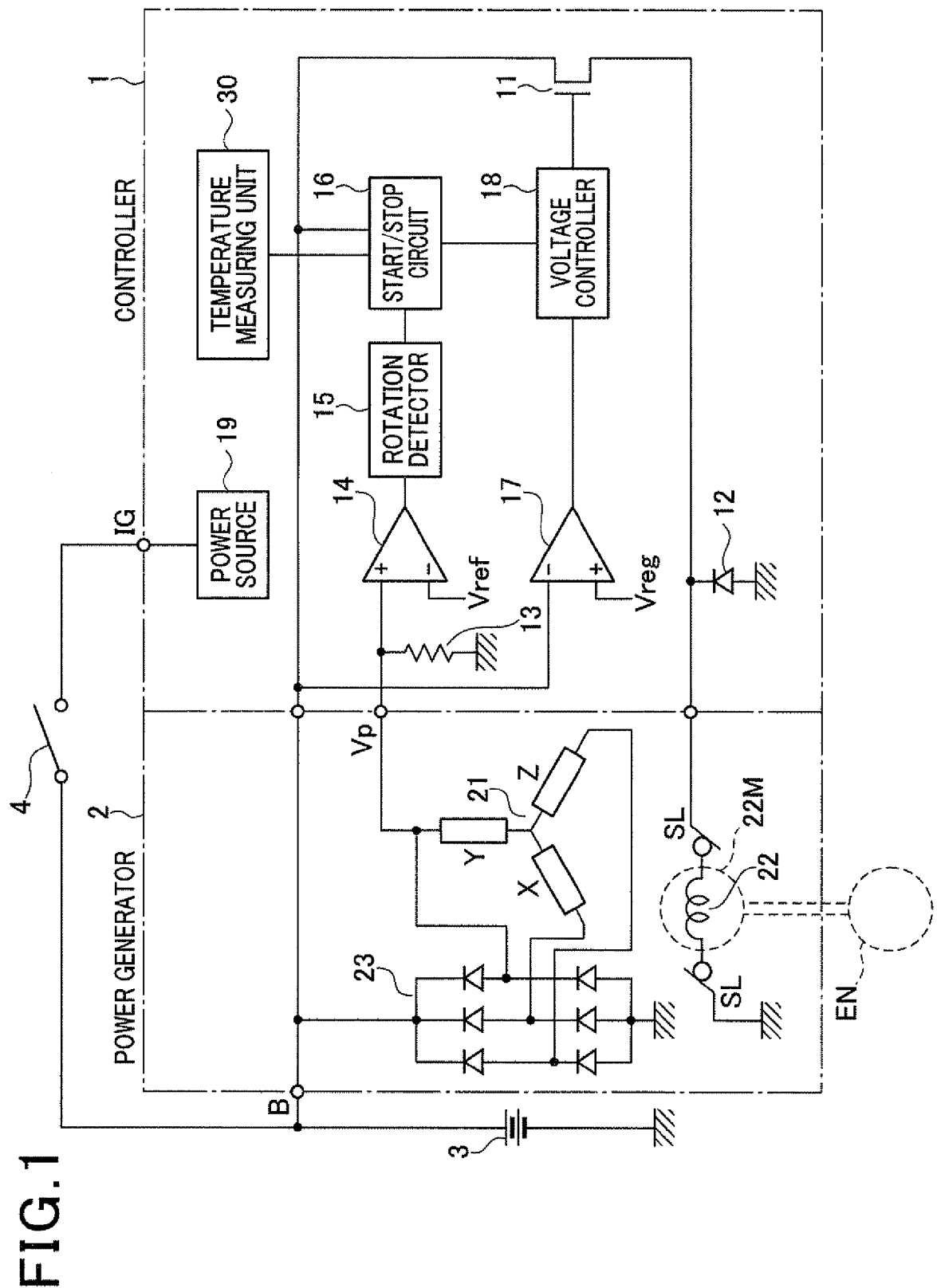
FIG. 1 is a circuit diagram schematically illustrating an example of a controller and a power generator according to an embodiment of the present disclosure.

An embodiment of the present disclosure will be described hereinafter with reference to the accompanying drawings. In the drawings, identical reference characters are utilized to identify identical corresponding components.

Referring to the drawings, particularly to FIG. 1, there is illustrated a controller 1 according to the embodiment of the present disclosure for controlling a power generator 2 installed in a motor vehicle. In this embodiment, as the power generator 2, a three-phase power generator 2 is used.

The three-phase power generator 2 includes stator (armature) windings 21, a rotor 22M including a field winding 22, and a full-wave rectifier 23.

The stator windings 21 are for example wound in a cylindrical stator core. For example, the stator core has an annular shape in its lateral cross section, and a plurality of slots formed therethrough and circumferentially arranged at given pitches. The stator windings 21 are wound in the slots of the stator core. The stator windings 21 consist of X-, Y-, and Z-phase windings, which are connected in, for example, a star configuration. The X-, Y-, and Z-phase windings each have one end connected to a common junction (neutral point), and the other end to a separate terminal. The rotor 22M is directly or indirectly coupled to a crankshaft of an engine (an internal combustion engine) EN installed in the motor vehicle. In other words, rotation of the rotor 22M can be transferred to the crankshaft of the engine EN as rotational power so that the crankshaft can be rotated by the rotational power, and rotation of the crankshaft can be transferred to the rotor 22M as rotational power so that the rotor 22M can be rotated by the rotational power.

The rotor 22M includes a plurality of field poles disposed to face the inner periphery of the stator core, and the field winding 22 wound around the field poles. The field winding 22 is electrically connected with the controller 1 via slip rings SL and the like. The full-wave rectifier 23 is disposed between the stator windings 21 and a battery 3, and is constructed as a three-phase full-wave rectifier (bridge circuit) as a whole. The full-wave rectifier 23 is operative to convert the AC voltage induced in the first stator windings 21 into a DC voltage.

Specifically, the full-wave rectifier 23 is comprised of three-pairs of high-side (upper-arm) and low-side (lower-arm) rectifier modules (for example, diodes in FIG. 1). The high- and low-side rectifier modules of each pair are connected in series with each other. The connection point between the high- and low-side rectifier modules of one pair is connected with the separate terminal of the X-phase winding. The connection point between the high- and low-side rectifier modules of an alternative pair is connected with the separate terminal of the Y-phase winding, and that between the high- and low-side rectifier modules of the last pair is connected with the separate terminal of the Z-phase winding In the power generator 2, when the field winding 22 is intermittently energized by the controller 1, while the rotor 22M is rotated by rotational power supplied from the engine EN, the rotating field winding 22 creates magnetic flux. The created magnetic flux magnetizes the plurality of field poles of the rotor 22M. The rotation of the plurality of magnetized field poles creates magnetic flux, and the created magnetic flux induces three-phase AC voltages in the three-phase stator windings 21. The three-phase AC voltages induced in the three-phase stator windings 21 are rectified by the full-wave rectifier 23, so that a direct current (DC) voltage is generated. The DC voltage is outputted as an output voltage VB from the power generator 2 to the battery 3 via an output terminal B to be charged therein, and/or to electrical loads (not shown) installed in the motor vehicle.

The power generator 2 is also operative to convert a DC voltage supplied from the battery 3 into three-phase AC voltages via the full-wave rectifier 23, and apply the three-phase AC voltages to the stator windings 21 to thereby generate rotary power (torque) to rotate the rotor 22M. The rotation of the rotor 22M allows the crankshaft of the engine EN to be rotated.

The controller 1 serves as a voltage regulator operative to regulate the output voltage VB of the power generator 2 to a target voltage (a regulated voltage) Vreg by, for example, increasing or reducing an excitation current to be supplied to the field winding 22. The controller (voltage regulator) 1 is, for example, juxtaposed with the power generator 2, but can be incorporated in the power generator 2.

As described above, the controller 1 is designed to control the excitation current to be supplied to the field winding 22, thus regulating the output voltage VB of the power generator 2 (the output voltage of the full-wave rectifier 23 to the target voltage Vreg).

Next, an example of the detailed structure of the controller 1 will be described.

Referring to FIG. 1, the controller 1 includes a MOSFET 11, a flywheel diode 12, a resistor 13 for measuring voltage, voltage comparators 14 and 17, a rotation detector 15, a power-generation start/stop circuit 16, a voltage controller 18, a power source 19, and a temperature measuring unit 30.

One terminal (source) of the MOSFET 11 is connected with the field winding 22, and the other terminal (drain) is connected with the battery 3 through the output terminal B. The control terminal (base) of the MOSFET 11 is connected with the voltage controller 18. The MOSFET 11 is operative to intermit the supply of an excitation current to the field winding 22. The flywheel diode 12 is connected with the one terminal of the MOSFET 11 to be parallel to the field winding 22. The flywheel diode 12 is operative to circulate a current flowing through the field winding 22 with the MOSFET 11 being off.

The resistor 13 has one end connected with the separate end of one phase winding (the Y-phase winding in this embodiment) of the stator windings 21, and the other end connected with ground. The resistor 13 serves as a measurer for measuring a voltage (a phase voltage) appearing thereacross. The voltage comparator 14 has a noninverting input terminal (+), an inverting input terminal, and an output terminal. The noninverting input terminal of the voltage comparator 14 is connected with the separate end of the one phase winding (the Y-phase winding). To the inverting input terminal of the comparator 14, a preset reference voltage Vref is configured to be constantly applied. The output terminal of the comparator 14 is connected with the input of the rotation detector 15.

The comparator 14 is operative to compare the phase voltage detected by the resistor 13 with the reference voltage Vref, and output a signal with a high level when the phase voltage is higher than the reference voltage Vref. As the phase voltage, a positive voltage and a negative voltage alternately appear across the resistor 13 in synchronization with rotation of the rotor 22M. In other words, the set of a positive voltage and a negative voltage periodically appear across the resistor 13. For this reason, when a positive peak value of the phase voltage is set to be higher than the reference voltage Vref, a period of change in the output signal from the comparator 14 from the high level to a low level (or the low level to the high level) is identical to a period of the phase voltage. Note that a voltage divider consisting of two or more resistors can be provided in place of the resistor 13, and a divided voltage based on the phase voltage can be inputted to the noninverting terminal of the comparator 14. The resistor 13 can be omitted if a phase voltage can be captured to the comparator 14 without the use of the resistor 13.

The rotation detector 15 is operative to detect the number of rotations of the rotor 22M of the power generator 2 based on the output signal of the comparator 14. Specifically, the rotation detector 15 is operative to measure each period of the phase voltage based on the output signal of the comparator 14, and count the number of rotations of the rotor 22M based on each period of the phase voltage. Note that, because the number of rotations of the rotor 22M of the power generator 2 is proportional to the engine speed, detection of the number of rotations of the rotor 22M is identical to detection of the engine speed, and various operations to be carried out by the controller 1 based on the detected number of rotations of the rotor 22M are identical to operations to be carried out by the controller 1 based on the engine speed.

The power-generation start/stop circuit (start/stop circuit) 16 is connected with the output terminal B of the power generator 2, and operatively connected with the rotation detector 15 and the voltage controller 18. The power-generation start/stop circuit 16 is operative to output, to the voltage controller 18, an instruction to reset an initial excitation mode of the voltage controller 18, thus bringing the operation mode of the voltage controller 18 to a power generation mode for starting generation of power when a local minimum peak of the measured number of rotations of the rotor 22M is continuously equal to or higher than a preset first threshold number N1 during a time period equal to or longer than an expected maximum value of cycle of pulsations of the engine speed. Note that the meaning of the initial excitation mode and the power generation mode of the voltage controller 18 will be described later. In addition, note that the expected maximum value of cycle of pulsations of the engine speed during startup of the engine EN has been empirically determined.

The power-generation start/stop circuit 16 is also operative to output, to the voltage controller 18, an instruction to shift the operation mode of the voltage controller 18 from the power generation mode to the initial excitation mode.

The voltage comparator 17 has a noninverting input terminal (+), an inverting input terminal, and an output terminal. To the noninverting input terminal of the voltage comparator 17, a variably determined target voltage (regulated voltage) Vreg is configured to be inputted. For example, a value of the target voltage Vreg can be determined to be outputted from an external ECU or an internal circuit. The inverting input terminal of the comparator 17 is connected with the output terminal B of the power generator 2, so that the output voltage VB of the power generator 2 is inputted to the inverting input terminal of the comparator 17. The output terminal of the comparator 17 is connected with the voltage controller 18.

The comparator 17 is operative to compare the output voltage VB with the target voltage Vreg, and output, to the voltage controller 18, either a signal with a high low level when the output voltage VB is higher than the target voltage Vreg or a signal with a high level when the output voltage VB is lower than the target voltage Vreg. Note that the comparator 17 can be provided with a voltage divider, the voltage divider is operative to divide the output voltage VB, and the comparator 17 can compare a divided value of the output voltage VB with the target voltage Vreg.

The voltage controller 18 operates in the initial excitation mode before start of generation of power or after stop of generation of power, to control the MOSFET 11 to supply an initial value of an excitation current to the field winding 22, thus preventing discharge from the battery 3. In this embodiment, the voltage controller 18 controls, in the initial excitation mode, a duty cycle of the MOSFET 11 to supply the initial value of the excitation current to the field winding 22. The duty cycle of the MOSFET 11 refers generally to the percentage (ratio) of on time of the MOSFET 11 to each on-off period thereof. In this embodiment, the voltage controller 18 is operative to set, in the initial excitation mode, the duty cycle of the MOSFET 11 to an initial value (percentage) very lower than its full value (100 percentage or close thereto).

The voltage controller 18 also operates in the power generation mode to start generation of power by increasing the excitation current to be supplied to the field winding 22 from the initial value. In this embodiment, the voltage controller 18 increases, in the power generation mode, the duty cycle of the MOSFET 11 from the initial value thereof gradually or steeply up to the full value. Note that, in this embodiment, the start of increase the excitation current to be supplied to the field winding 22 from the initial value is defined as start of generation of power. After start of generation of power, the voltage controller 18 is operative to increase or decrease the excitation current to be supplied to the field winding 22 by, for example, adjusting the duty cycle of the MOSFET 11, thus regulating the output voltage VB of the power generator 2 to the target voltage Vreg.

The power source 19 is connected with an ignition switch 4 of the motor vehicle via a terminal IG, and operative to generate an operating voltage for each component included in the controller 1, and continuously supply the operating voltage to each component included in the controller 1 as long as the ignition switch 4 is in on state.

The temperature measuring unit 30 is connected with the power-generation start/stop circuit 16, and operative to measure the temperature around the engine EN and output, to the power-generation start/stop circuit 16, a measured value of the temperature around the engine EN as the ambient temperature of the engine EN. Note that, for the temperature measuring unit 30 according to this embodiment, determination of whether the temperature around the engine EN is higher than a preset threshold temperature TE1 between normal temperature and low temperature is required. For this reason, as the temperature measuring unit 30, a temperature sensor can be located at a portion associated with the ambient temperature of the engine EN in the motor vehicle, for example, located inside the controller 1 or close thereto. The temperature sensor can measure the temperature at the portion, and output, to the power-generation start/stop circuit 16, a measured value of the temperature at the portion as the ambient temperature of the engine EN.

Note that the MOSFET 11 serves as, for example, a switch, a set of the resistor 13, the voltage comparator 14, and the rotation detector 15 serves as, for example, a rotation measuring unit, and the power-generation start/stop circuit 16 serves as, for example, a mode-shift determiner.

Basic operations of the controller 1 for determination of start of generation of power during startup of the engine EN will be described hereinafter with reference to FIG. 2.

When the ignition switch 4 is turned on so that each component of the controller 1 is activated, a starting operation of the engine EN is carried out, and the voltage controller 18 operates in the initial excitation mode to control the MOSFET 11 to supply the initial value of the excitation current to the field winding 22 in step 100. In response to the start of the starting operation of the engine EN, the rotation detector 15 detects the number of rotations of the rotor 22M (power generator 2) based on each period of change in the output signal (each period of the phase voltage) in step 102.

Next, the power-generation start/stop circuit 16 determines whether a local minimum peak of the measured rotation number of the rotor 22M of the power generator 2 is equal to or higher than the first threshold number N1 during a current preset time period T; the time period T is equal to or longer than the expected maximum value of cycle C of pulsations of rotation of the engine EN in step 104.

When the power-generation start/stop circuit 16 determines that the local minimum peak of the measured rotation number of the rotor 22M of the power generator 2 during the time period T is lower than the first threshold number N1 (NO in step 104), the voltage controller 18 maintains the initial excitation mode in step S106, and the rotation detector 15 continues detection of the number of rotations of the rotor 22M in step S102. That is, until the determination in step 104 is YES, the operations in steps S102 and 104 are repeated for the next time period T.

Otherwise, when the power-generation start/stop circuit 16 determines that the local minimum peak of the measured rotation number of the rotor 22M of the power generator 2 during the time period T is equal to or higher than the first threshold number N1 (YES in step 104), the power-generation start/stop circuit 16 instructs the voltage controller 18 to reset the initial excitation mode to shift to the power generation mode in step 108. Thus, the voltage controller 18 operates in the power generation mode to start generation of power by increasing the excitation current to be supplied to the field winding 22 from the initial value up in step 108. The operation in step 108 allows the output voltage VB to be regulated to the target voltage Vreg.

Figure 2:
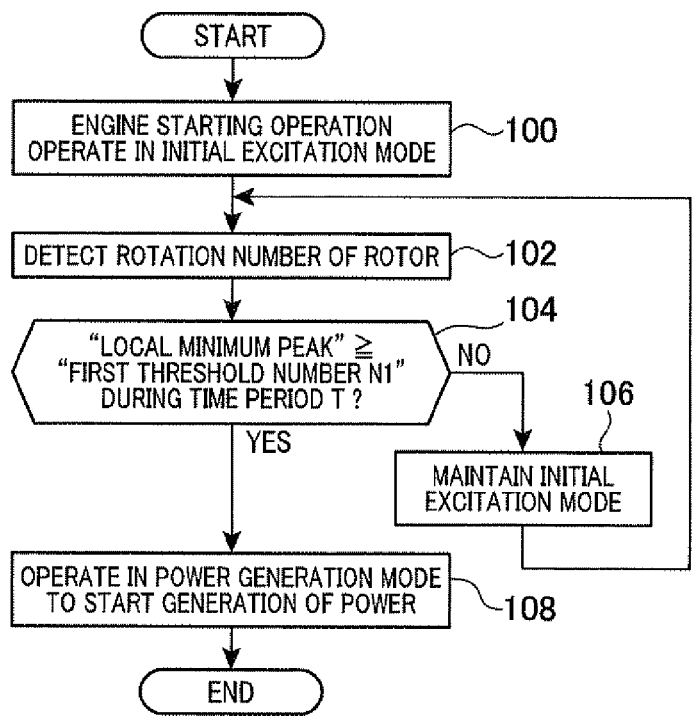
FIG. 2 is a flowchart schematically illustrating the flow of basic operations to be executed by the controller according to the embodiment.
Figure 3:
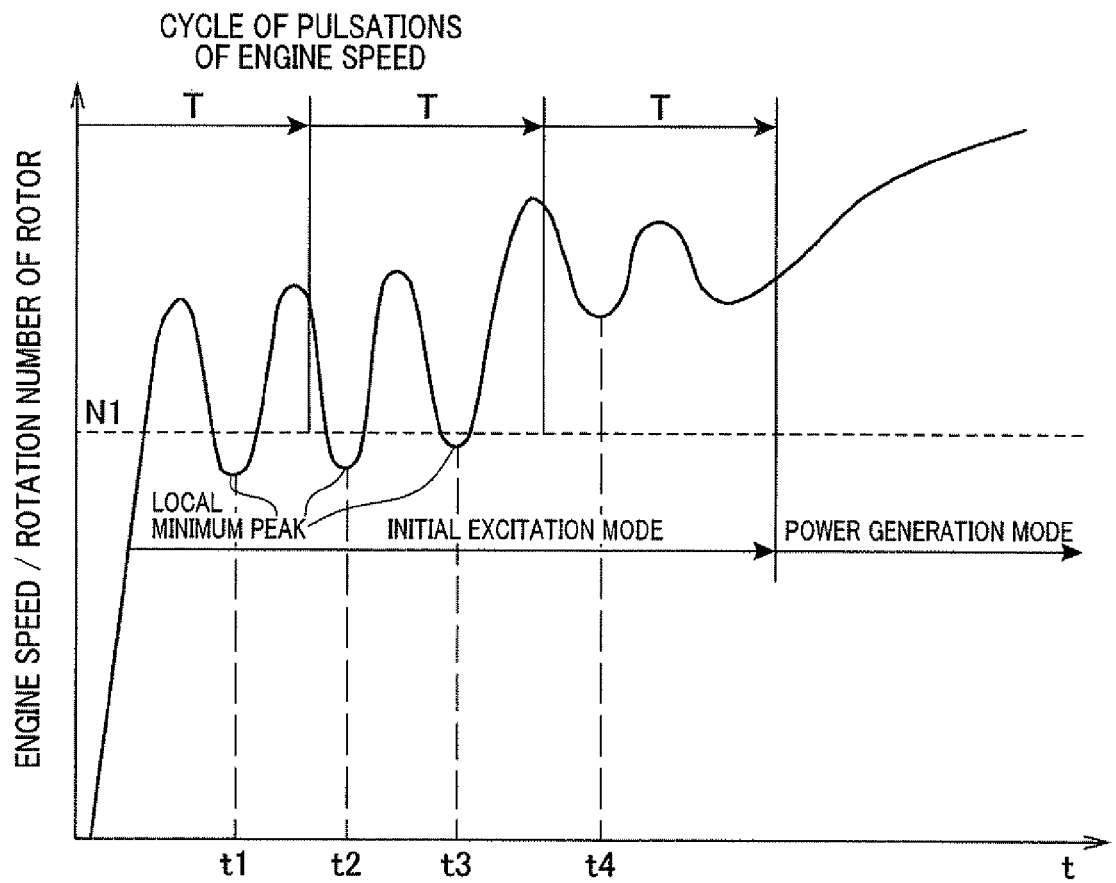
FIG. 3 is a timing chart schematically illustrating operation timings of the controller corresponding to the operations in FIG. 2.

FIG. 3 schematically illustrates operation timings of the controller 1 corresponding to the operations in FIG. 2. In FIG. 3, the vertical axis represents the number of rotations of the rotor 22M corresponding to the engine speed, and the horizontal axis represents elapsed time t since the start of startup of the engine EN.

As illustrated in FIG. 3, at each of times t1, t2, and t3, because a corresponding local minimum peak of the measured rotation number of the rotor 22M of the power generator 2 during a corresponding time period T is lower than the first threshold number N1, the initial excitation mode of the voltage controller 18 is maintained (see steps 104 and 106 of FIG. 2).

However, at time t4, because a corresponding local minimum peak of the measured rotation number of the rotor 22M of the power generator 2 during a corresponding time period T is higher than the first threshold number N1, the operation mode of the voltage controller 18 is shifted from the initial excitation mode to the power generation mode at the timing of the completion of the corresponding time period T, so that the voltage controller 18 operates in the power generation mode to start generation of power by increasing the excitation current to be supplied to the field winding 22 from the initial value (see steps 104 and 108).

As described above, the controller 1 according to this embodiment makes it possible to start generation of power when the number of rotations of the rotor 22M is reliably equal to or higher than the first threshold rotation number N1 even if there are large engine-speed pulsations during engine startup. This prevents the engine speed from dropping, thus improving the startability of the engine EN. Particularly, the controller 1 according to this embodiment is configured to measure the number of rotations of the rotor 22M based on each period of the phase voltage. This configuration can minimize the delay of determination of start of generation of power due to time required to detect the number of rotations of the rotor 22M, thus immediately supplying power from the power generator 2 to the battery 3.

First Modification

A controller according to the first modification of the embodiment of the present disclosure will be described with reference to FIGS. 4 and 5.

The structure and/or functions of the controller according to the first modification are different from those of the controller 1 by the following points. So, the different points will be mainly described hereinafter.

Operations of the controller according to the first modification for determination of start of generation of power during startup of the engine EN will be described hereinafter with reference to FIG. 4. In the flowcharts of FIGS. 2 and 4, like operations (steps), to which like reference step numbers are assigned, are omitted or simplified in redundant description.

Specifically, the controller according to the first modification is programmed to perform the following operations in steps 200 to 206 before the operation in step 100. Thus, the operations in steps 200 to 206 will be fully described hereinafter.

When the ignition switch 4 is turned on so that each component of the controller 1 is activated, the temperature measuring unit 30 measures the ambient temperature of the engine EN in step 200, and the power-generation start/stop circuit 16 determines whether the measured ambient temperature of the engine EN is equal to or higher than the preset threshold temperature TE1 in step 202.

When determining that the measured ambient temperature of the engine EN is lower than the preset threshold temperature TE1 (NO in step 202), the power-generation start/stop circuit 16 determines that the engine startup occurs within a low temperature range (in other words, the engine startup is cold starting). Then, the power-generation start/stop circuit 16 sets a time period T1 as the time period T in step 204. For example, in step 204, the power-generation start/stop circuit 16 sets, as the time period T1, a same value as the time period T used in step 104 of FIG. 2.

Otherwise, when determining that the measured ambient temperature of the engine EN is equal to or higher than the preset threshold temperature TE1 (YES in step 202), the power-generation start/stop circuit 16 determines that the engine startup occurs within a normal temperature range except for the low temperature range. Then, the power-generation start/stop circuit 16 sets a time period T2 as the time period T in step 206; the time period T2 is shorter than the time period T1.

After the operation in step 200 or 206, the controller according to the first modification performs the operations in steps 100 to 108 set forth above. Note that, in the first modification, the controller performs the operations in steps 200 to 206, but can perform them after completion of execution of the operations in steps 100 to 108, or can perform them in parallel to the operations in steps 100 to 108.

Figure 4:
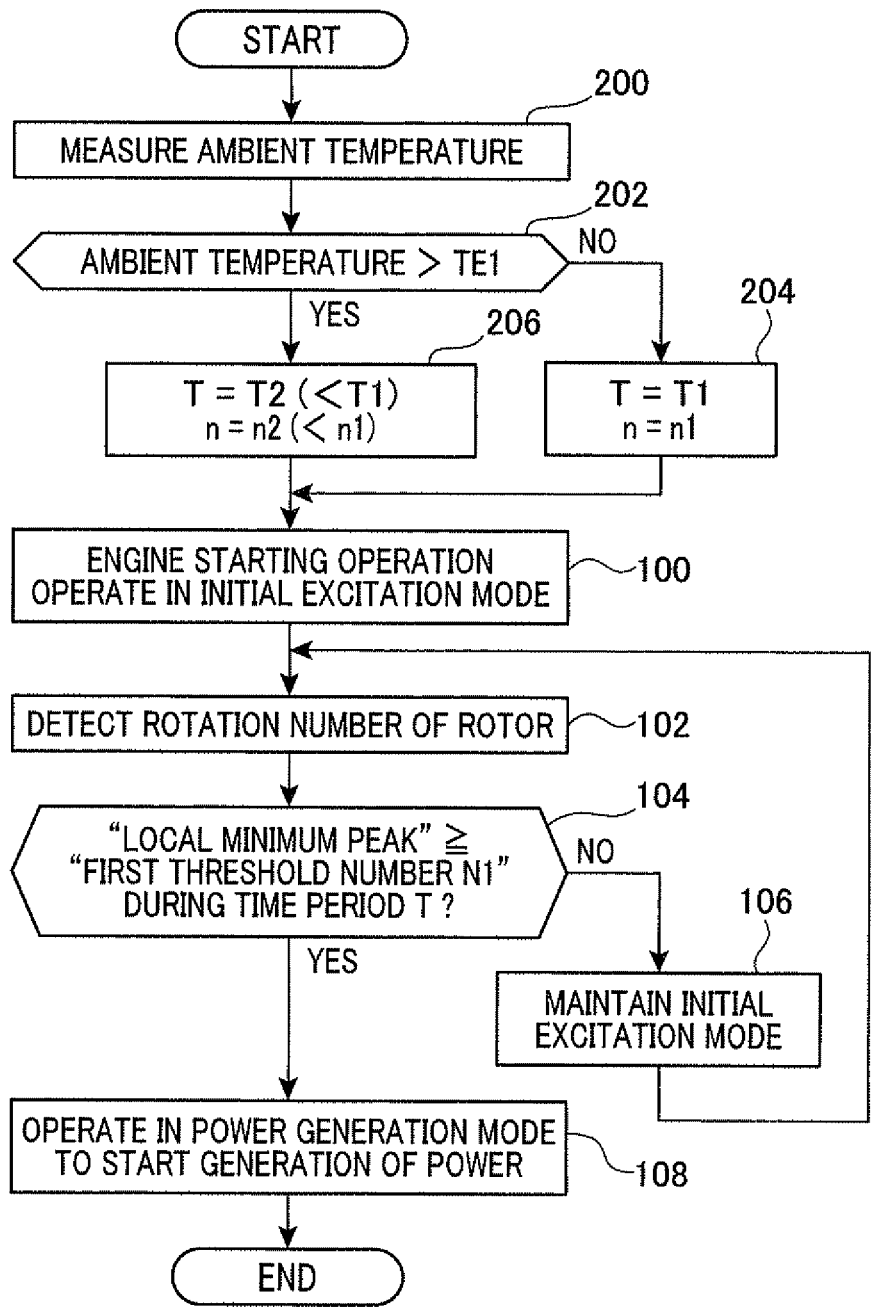
FIG. 4 is a flowchart schematically illustrating the flow of operations to be executed by the controller according to the first modification of the embodiment.
Figure 5:
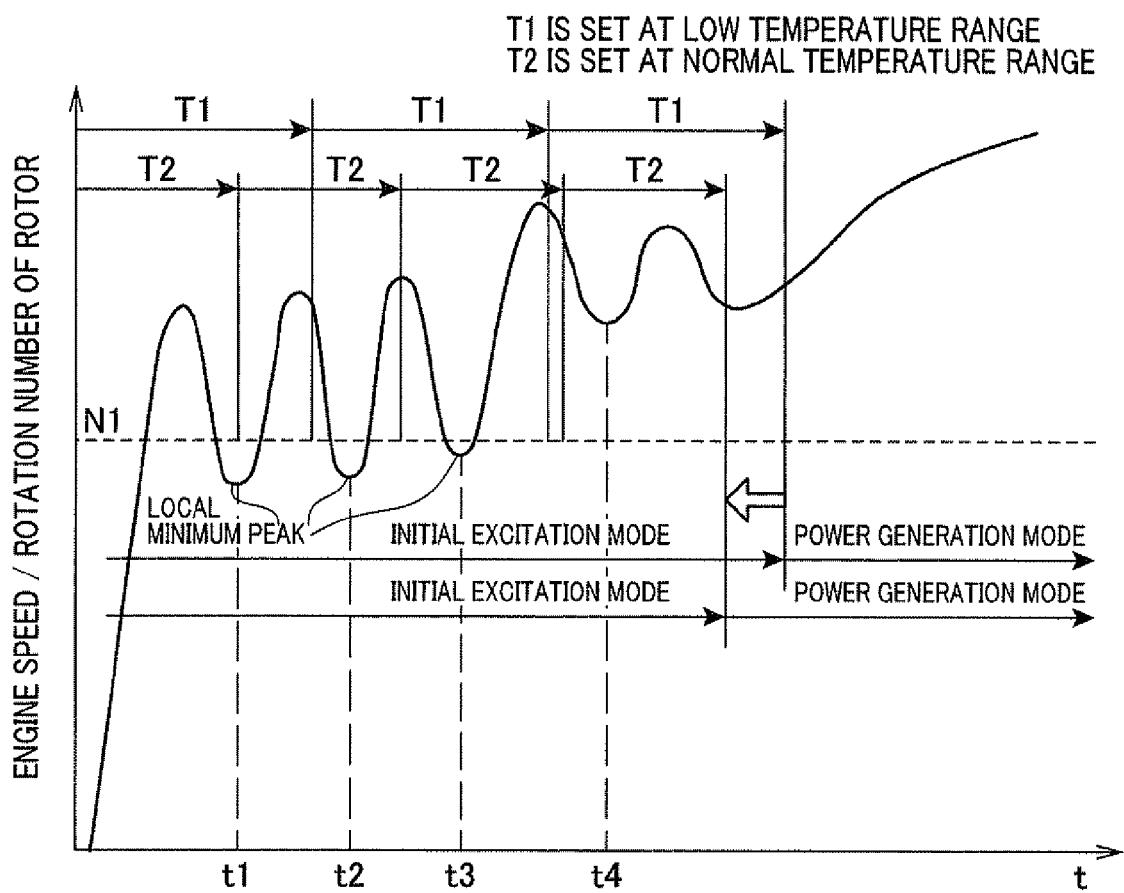
FIG. 5 is a timing chart schematically illustrating operation timings of the controller corresponding to the operations in FIG. 4.

FIG. 5 schematically illustrates operation timings of the controller corresponding to the operations in FIG. 4. As illustrated in FIG. 5, when the engine startup occurs within the low temperature range, the operation mode of the voltage controller 18 is shifted from the initial excitation mode to the power generation mode at the timing of the completion of the corresponding time period T1. In contrast, when the engine startup occurs within the normal temperature range, the operation mode of the voltage controller 18 is shifted from the initial excitation mode to the power generation mode at the timing of the completion of the corresponding time period T2; the shift timing is earlier than the shift timing for the engine startup within the low temperature range.

That is, because there are great pulsations of the engine speed within the low temperature range so that the expected maximum value of the cycle of the pulsations is increased, a value of the time period T used to determine whether power generation is started is required to be long. In contrast, when engine startup occurs within the normal temperature range, pulsations of the engine speed within the normal temperature range are smaller than those of the engine speed within the low temperature range so that the expected maximum value of the cycle of the pulsations for engine startup within the normal temperature range is reduced in comparison to the expected maximum value of the cycle of the pulsations for engine startup within the low temperature range. Thus, a value of the time period T used to determine whether power generation is started can be set to be shorter than the value of the time period T for the low temperature range.

As described above, the controller according to the first modification is configured to variably set a value of the time period T depending on variation of the ambient temperature of the engine EN. This configuration secures a time length required to start power generation; the time length is optimum for each value of the ambient temperature of the engine EN. This achieves, in addition to the effects achieved in the embodiment, an effect of further improving the startability of the engine EN in consideration of the ambient temperature of the engine EN.

Second Modification

A controller according to the second modification of the embodiment of the present disclosure will be described with reference to FIGS. 6 and 7.

The structure and/or functions of the controller according to the second modification are different from those of the controller 1 by the following points. So, the different points will be mainly described hereinafter.

Operations of the controller according to the second modification for determination of start of generation of power during startup of the engine EN will be described hereinafter with reference to FIG. 6. In the flowcharts of FIGS. 2 and 6, like operations (steps), to which like reference step numbers are assigned, are omitted or simplified in redundant description.

Specifically, the controller according to the second modification is programmed to perform the following operations in steps 300 to 304 between the operations in steps 102 and 104. Thus, the operations in steps 300 to 304 will be fully described hereinafter.

After measurement of the rotation number of the rotor 22M of the power generator 2, the power-generation start/stop circuit 16 determines whether the measured rotation number is higher than a second threshold number N2 in step 300; the rotation number N2 is higher than the first threshold number N1 used to comparison of a local minimum peak of the measured rotation number of the rotor 22M of the power generator 2.

When determining that the measured rotation number is equal to or lower than the second threshold number N2 (NO in step 300), the power-generation start/stop circuit 16 sets a time period T1 as the time period T in step 302. For example, in step 302, the power-generation start/stop circuit 16 sets, as the time period T1, a same value as the time period T used in step 104 of FIG. 2.

Otherwise, when determining that the measured rotation number is higher than the second threshold number N2 (YES in step 300), the power-generation start/stop circuit 16 sets a time period T2 as the time period T in step 304; the time period T2 is shorter than the time period T1.

After the operation in step 302 or 304, the controller according to the second modification performs the operations in steps 104 to 108 set forth above.

Figure 6:
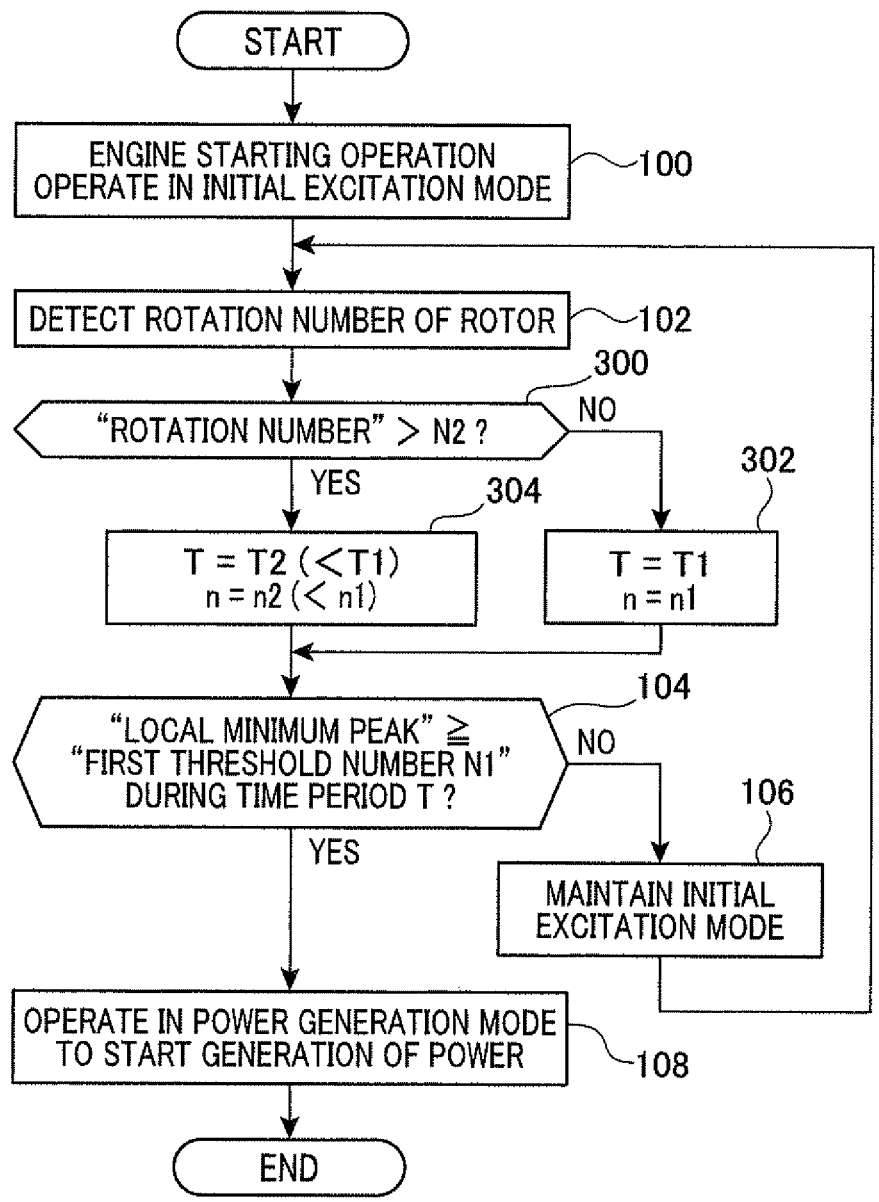
FIG. 6 is a flowchart schematically illustrating the flow of operations to be executed by the controller according to the second modification of the embodiment.
Figure 7:
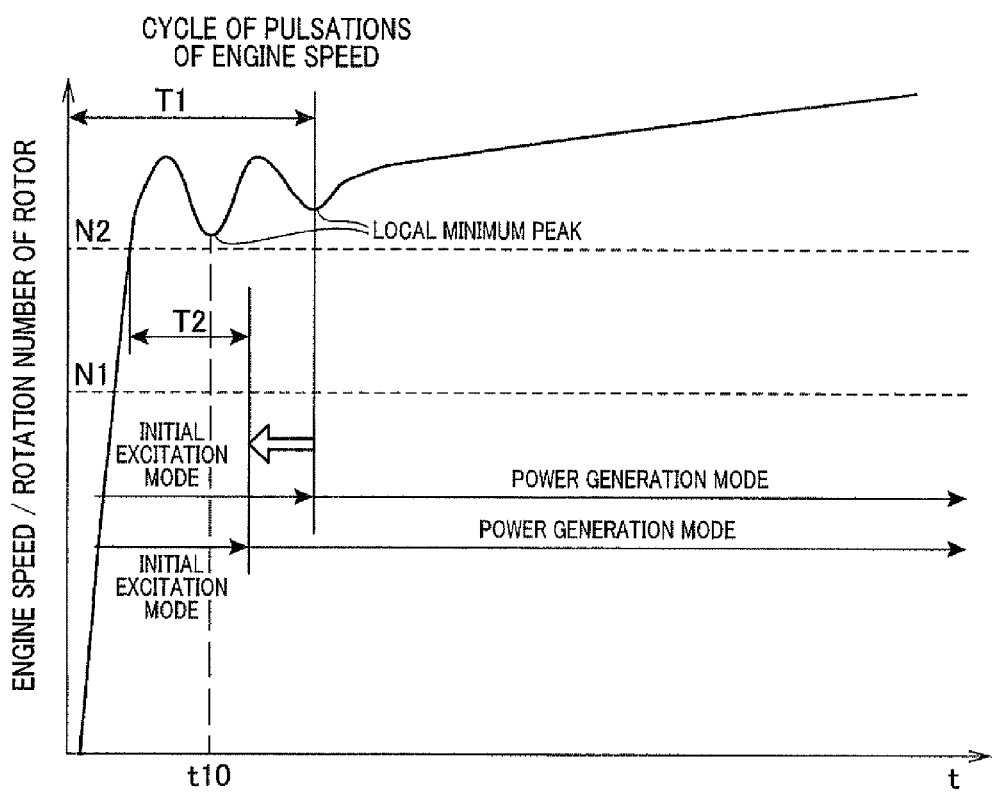
FIG. 7 is a timing chart schematically illustrating operation timings of the controller corresponding to the operations in FIG. 6.

FIG. 7 schematically illustrates operation timings of the controller corresponding to the operations in FIG. 6. As illustrated in FIG. 7, when the engine startup occurs within the normal temperature range, the rotation number of the rotor 22M of the power generator 2, that is, the engine speed rises immediately so that the rotation number exceeds the first threshold number N1 to reach the second threshold number N2. At that time, the time period T used to determine start of generation of power is shifted from the value T1 for engine startup within the low temperature range to the value T2 for engine startup within the normal temperature range; the value T2 is lower than the value T1.

Thus, the controller according to the second modification is configured to determine that engine startup occurs within the normal temperature range when the rotation number of the rotor 22M is higher than the second threshold number N2 higher than the first threshold number N1 before start of generation of power, thus reducing the time period T used to determine start of generation of power. This configuration achieves, in addition to the effects achieved in the embodiment, an effect of reducing time required to start generation of power while sufficiently securing the startability of the engine EN within the normal temperature range.

Third Modification

A controller according to the third modification of the embodiment of the present disclosure will be described with reference to FIG. 8.

The structure and/or functions of the controller according to the second modification are different from those of the controller 1 by the following points. So, the different points will be mainly described hereinafter.

Operations of the controller according to the third modification for determination of start of generation of power during startup of the engine EN will be described hereinafter with reference to FIG. 8.

When the ignition switch 4 is turned on so that each component of the controller 1 is activated, a starting operation of the engine EN is carried out, and the voltage controller 18 operates in the initial excitation mode to control the MOSFET 11 to supply the initial value of the excitation current to the field winding 22 in step 400. In response to the start of the starting operation of the engine EN, the power-generation start/stop circuit 16 sets a previously prepared count value j for counting the number of periods of the phase voltage to an initial state value of zero in step 402, and the rotation detector 15 detects the number of rotations of the rotor 22M (power generator 2) based on each period of change in the output signal (each period of the phase voltage) in step 404.

Next, the power-generation start/stop circuit 16 determines whether the measured rotation number of the rotor 22M of the power generator 2 is equal to or higher than the first threshold number N1 in step 406.

When the power-generation start/stop circuit 16 determines that the measured rotation number of the rotor 22M of the power generator 2 is lower than the first threshold number N1 (NO in step 406), the voltage controller 18 maintains the initial excitation mode in step S408, and the operations in steps S402 to S406 are repeated until the determination in step 406 is YES.

Otherwise, when determining that the measured rotation number of the rotor 22M of the power generator 2 is equal to or higher than the first threshold number N1 (YES in step 406), the power-generation start/stop circuit 16 increments the count value j by 1 in step 410. Then, the power-generation start/stop circuit 16 compares the count value j with a preset number n of periods of the phase voltage corresponding to the time period T to thereby determine whether the count value j is higher than the preset number n of continuous periods of the phase voltage corresponding to the time period T; the time period T is equal to or longer than the expected maximum value of cycle C of pulsations of rotation of the engine EN in step 412.

Specifically, the number n of continuous periods of the phase voltage is set to be higher than the number of periods of the phase voltage corresponding to intervals of explosions of air-fuel mixture in the engine EN while the engine EN is cranked.

When the power-generation start/stop circuit 16 determines that the count value j is equal to or lower than the preset number n of continuous periods of the phase voltage (NO in step 412), the voltage controller 18 maintains the initial excitation mode in step S414, and the operations in steps S404 to S414 are repeated until the determination in step 412 is YES.

Otherwise, when determining that the count value j is higher than the preset number n of continuous periods of the phase voltage (YES in step 412), the power-generation start/stop circuit 16 instructs the voltage controller 18 to reset the initial excitation mode to shift to the power generation mode in step 416. Thus, the voltage controller 18 operates in the power generation mode to start generation of power by increasing the excitation current to be supplied to the field winding 22 from the initial value up in step 416. The operation in step 416 allows the output voltage VB to be regulated to the target voltage Vreg.

Specifically, when the engine startup occurs within the normal temperature range, the rotation number of the rotor 22M of the power generator 2, that is, the engine speed rises immediately so that the number of times when the measured rotation number of the rotor 22M exceeds the first threshold number N11 becomes higher the number n of continuous periods of the phase voltage corresponding to the time period T; the time period T is equal to or longer than the expected maximum value of cycle C of pulsations of rotation of the engine EN (see step 412).

Then, the voltage controller 18 operates in the power generation mode to start generation of power by increasing the excitation current to be supplied to the field winding 22 from the initial value (see step 416).

As described above, the controller according to the third modification is configured to determine start of generation of power by monitoring the rotation number of the rotor 22M for each period of the phase voltage over the n continuous periods of the phase voltage. This configuration achieves, in addition to the effects achieved in the embodiment, an effect of simplifying determination of the timing to start generation of power while sufficiently securing the startability of the engine EN within the normal temperature range. In addition, because the controller according to the third modification is configured to determine the timing to start generation of power immediately after determining that the count value j is higher than the preset number n of periods of the phase voltage. This configuration makes the time to start generation of power shorter than that according to the embodiment.

Figure 8:
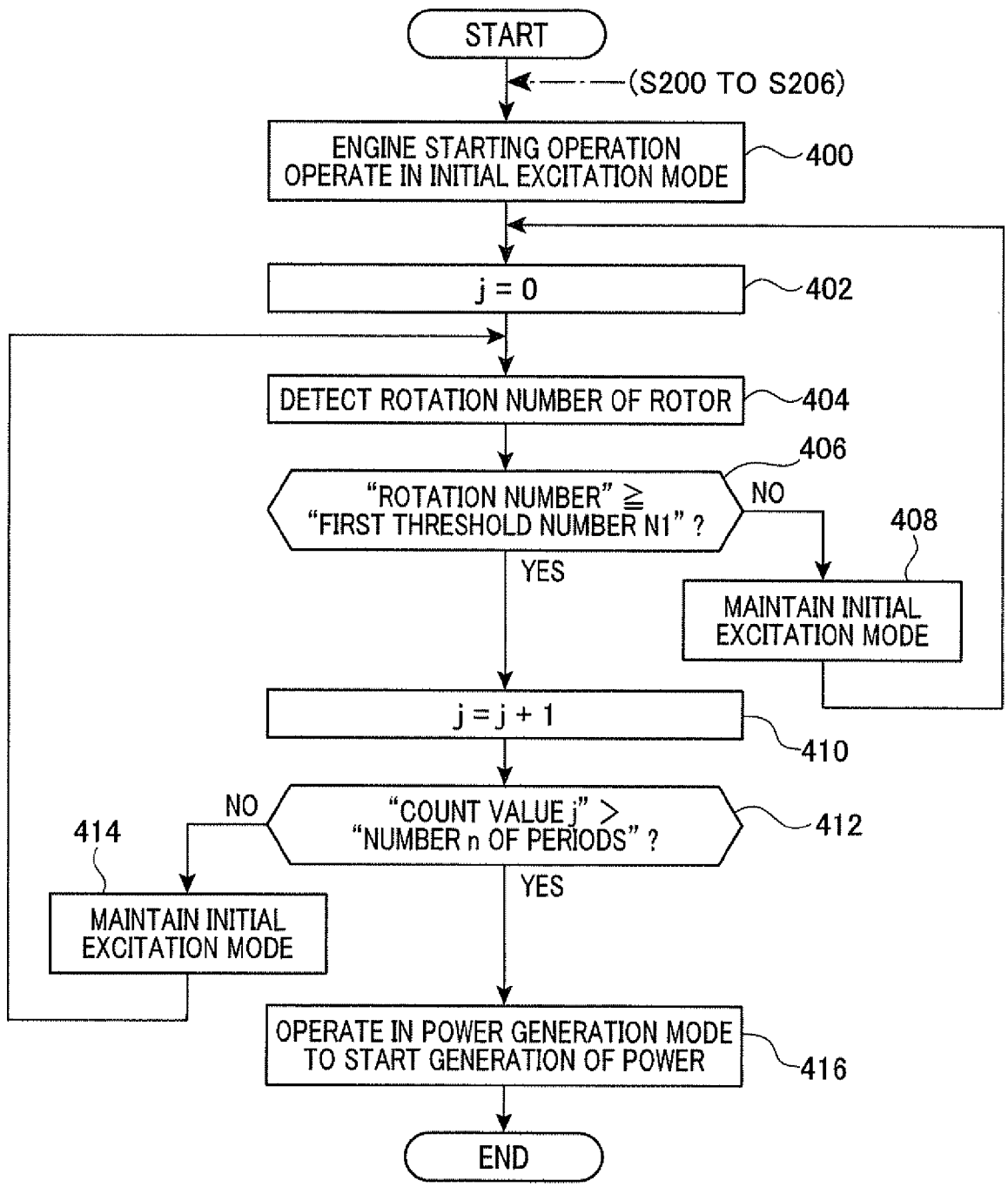
FIG. 8 is a flowchart schematically illustrating the flow of operations to be executed by the controller according to the third modification of the embodiment.

Note that the first modification for variably setting the time period T used to determine whether power generation is started according to the ambient temperature of the engine EN has been described according to FIG. 4, but the first modification can be combined with the operations illustrated in FIG. 8.

Specifically, the controller according to the first modification can be programmed to perform the operations in steps 200 to 206 of FIG. 4 before the operation in step 400 of FIG. 8. In this case, the power-generation start/stop circuit 16 determines that the engine startup occurs within the low temperature range, thus setting the number n1 of periods of the phase voltage as the number n of periods of the phase voltage for engine startup within the low temperature range in step 204; the value n1 is equal to the number n of periods of the phase voltage.

In addition, the power-generation start/stop circuit 16 determines that the engine startup occurs within the normal temperature range, thus setting the number n2 of periods of the phase voltage as the number n of periods of the phase voltage for engine startup within the normal temperature range in step 206; the number n2 of periods of the phase voltage is lower than the number n1 of periods of the phase voltage.

That is, because there are great pulsations of the engine speed within the low temperature range so that the expected maximum value of the cycle of the pulsations is increased, a value of the time period T used to determine whether power generation is started is required to be long so that a value of the number n of period of the phase voltage is set to be high. In contrast, when engine startup occurs within the normal temperature range, pulsations of the engine speed within the normal temperature range are smaller than those of the engine speed within the low temperature range so that the expected maximum value of the cycle of the pulsations for engine startup within the normal temperature range is reduced in comparison to the expected maximum value of the cycle of the pulsations for engine startup within the low temperature range. Thus, because a value of the time period T used to determine whether power generation is started can be set to be shorter than the value of the time period T for the low temperature range, a value of the number n of period of the phase voltage is set to be lower than the value of the number n of period of the phase voltage for the low temperature range.

As described above, the controller according to the combination of the first and third modifications is configured to variably set a value of the number n of periods of the phase voltage used to determine whether power generation is started depending on variation of the ambient temperature of the engine EN. This configuration can further achieve the same effects as the first modification does in addition to the effects of the third modification.

Similarly, the second modification for variably setting the time period T used to determine whether power generation is started when the rotation number of the rotor 22M rises rapidly has been described according to FIG. 6, but the second modification can be combined with the operations illustrated in FIG. 8.

Specifically, the controller according to the second modification can be programmed to perform the operations in steps 300 to 304 of FIG. 6 between the operations in steps 404 and 406 of FIG. 8. In this case, when determining that the measured rotation number is equal to or lower than the rotation number N2 (NO in step 300), the power-generation start/stop circuit 16 sets the number n1 of periods of the phase voltage as the number n of periods of the phase voltage in step 302; the value n1 is equal to the number n of periods of the phase voltage.

Otherwise, when determining that the measured rotation number is higher than the rotation number N2 (YES in step 300), the power-generation start/stop circuit 16 sets the number n2 of periods of the phase voltage as the number n of periods of the phase voltage for engine startup within the normal temperature range in step 206; the number n2 of periods of the phase voltage is lower than the number n1 of periods of the phase voltage.

That is, when the engine startup occurs within the normal temperature range, the rotation number of the rotor 22M of the power generator 2, that is, the engine speed rises immediately so that the rotation number exceeds the first threshold number N1 to reach the second threshold number N2. At that time, the number n of periods of the phase voltage used to determine start of generation of power is shifted from the value n1 for engine startup within the low temperature range to the value n2 for engine startup within the normal temperature range; the value n2 is lower than the value n1.

Thus, the controller according to the combination of the second and third modifications is configured to determine that engine startup occurs within the normal temperature range when the rotation number of the rotor 22M is higher than the rotation number N2 higher than the first threshold number N1 before start of generation of power, thus reducing the number n of periods of the phase voltage used to determine start of generation of power. This configuration can further achieve the same effects as the second modification does in addition to the effects of the third modification.

Fourth Modification

A controller according to the fourth modification of the embodiment of the present disclosure will be described with reference to FIGS. 9 and 10.

The structure and/or functions of the controller according to the fourth modification are different from those of the controller 1 by the following points. So, the different points will be mainly described hereinafter.

Operations of the controller according to the fourth modification for determination of start of generation of power during startup of the engine EN will be described hereinafter with reference to FIG. 9. In the flowcharts of FIGS. 2 and 9, like operations (steps), to which like reference step numbers are assigned, are omitted or simplified in redundant description.

Specifically, the controller according to the fourth modification is programmed to perform the following operations in steps 500 to 506 before the operation in step 100. Thus, the operations in steps 500 to 506 will be fully described hereinafter.

When the ignition switch 4 is turned on so that each component of the controller 1 is activated, the temperature measuring unit 30 measures the ambient temperature of the engine EN in step 500, and the power-generation start/stop circuit 16 determines whether the measured ambient temperature of the engine EN is equal to or higher than a preset threshold temperature TE2 in step 502.

When determining that the measured ambient temperature of the engine EN is lower than the preset threshold temperature TE2 (NO in step 502), the power-generation start/stop circuit 16 determines that the engine startup occurs within the low temperature range. Then, the power-generation start/stop circuit 16 sets a rotation number of the rotor 22M for the low temperature range; the rotation number of the rotor 22M is equal to the first threshold number N1 used in step 104 of FIG. 2.

Otherwise, when determining that the measured ambient temperature of the engine EN is equal to or higher than the preset threshold temperature TE2 (YES in step 502), the power-generation start/stop circuit 16 determines that the engine startup occurs within the normal temperature range. Then, the power-generation start/stop circuit 16 sets a third threshold number N1' of the rotor 22M in step 506; the third threshold number N1' is shorter than the first threshold number N1.

After the operation in step 504 or 506, the controller according to the fourth modification performs the operations in steps 100 to 108 set forth above while using the first threshold number N1 or the third threshold number N1' in step 104. Note that, in the fourth modification, the controller performs the operations in steps 500 to 506, but can perform them after completion of execution of the operations in steps 100 to 108, or can perform them in parallel to the operations in steps 100 to 108. The threshold temperature TE2 can be set to be equal to or different from the threshold temperature TE1 used in step 202 of FIG. 4. The operations in steps 500 to 506 can be combined with each of the operations in FIG. 4, the operations in FIG. 6, and the operations in FIG. 8.

Figure 9:
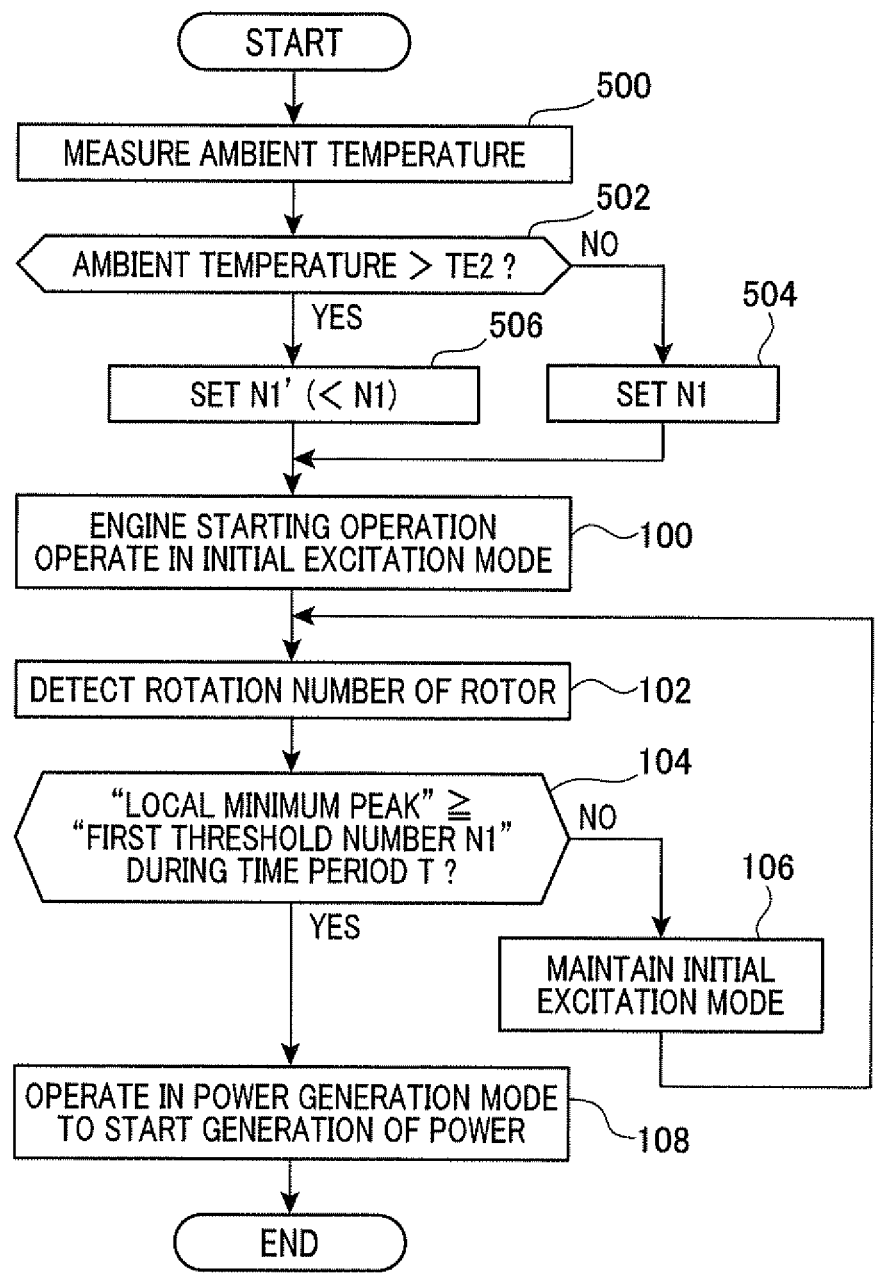
FIG. 9 is a flowchart schematically illustrating the flow of operations to be executed by the controller according to the fourth modification of the embodiment.
Figure 10:
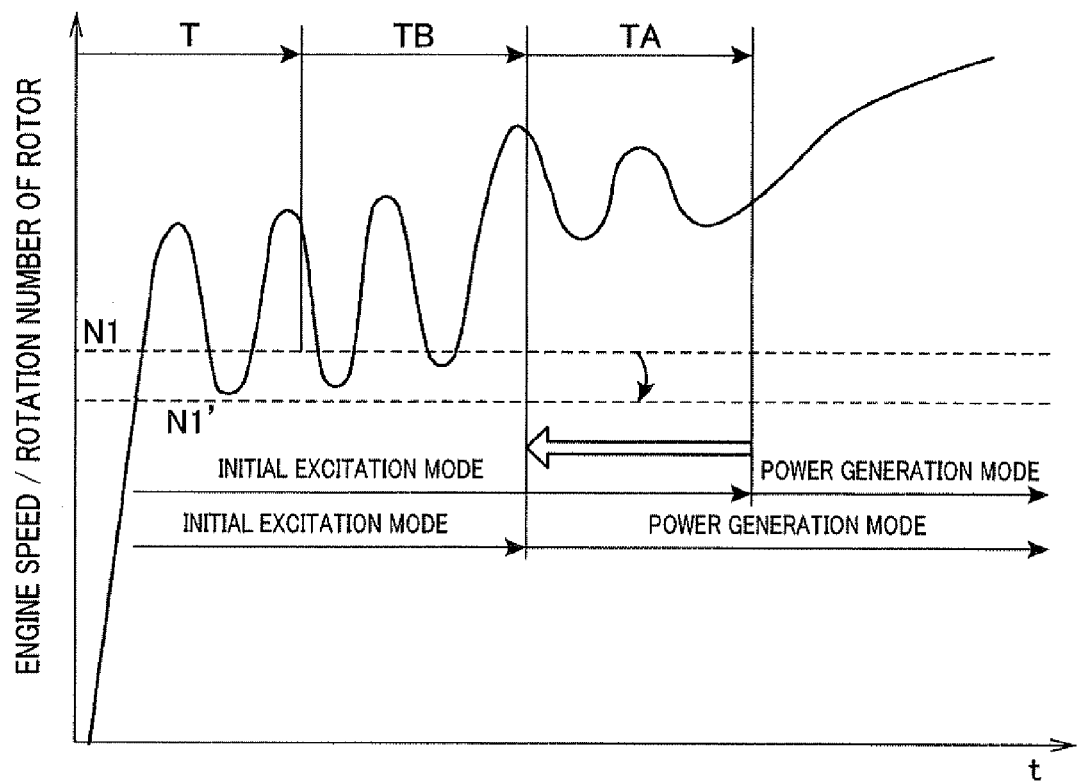
FIG. 10 is a timing chart schematically illustrating operation timings of the controller corresponding to the operations in FIG. 9.

FIG. 10 schematically illustrates operation timings of the controller corresponding to the operations in FIG. 9. As illustrated in FIG. 10, when the engine startup occurs within the low temperature range, the operation mode of the voltage controller 18 is shifted from the initial excitation mode to the power generation mode at the timing of the completion of the time period TA within which the local minimum peak of the measured rotation number of the rotor 22M during the time period TA is equal to or higher than the first threshold number N1.

In contrast, when the engine startup occurs within the normal temperature range, the operation mode of the voltage controller 18 is shifted from the initial excitation mode to the power generation mode at the timing of the completion of the time period TB within which the local minimum peak of the measured rotation number of the rotor 22M during the time period TB is equal to or higher than the third threshold number N1'; the shift timing is earlier than the shift timing for the engine startup within the low temperature range.

That is, because there are great pulsations of the engine speed within the low temperature range so that the expected maximum value of the cycle of the pulsations is increased, a value of the threshold number used to determine whether power generation is started is required to be long. In contrast, when engine startup occurs within the normal temperature range, pulsations of the engine speed within the normal temperature range are smaller than those of the engine speed within the low temperature range so that the expected maximum value of the cycle of the pulsations for engine startup within the normal temperature range is reduced in comparison to the expected maximum value of the cycle of the pulsations for engine startup within the low temperature range. Thus, a value N1' of the threshold number used to determine whether power generation is started can be set to be shorter than the value N1 of the threshold number for the low temperature range.

As described above, the controller according to the fourth modification is configured to reduce time required to determine start of generation of power when engine startup occurs within the normal temperature range during which stable rotation of the engine EN with few pulsations is obtained. This configuration achieves, in addition to the effects achieved in the embodiment, an effect of improving the startability of the engine EN within the normal temperature range. In addition, the controller according to the fourth modification is configured to prevent start of generation of power until rotation of the engine EN becomes sufficiently stable. This configuration achieves, in addition to the effects achieved in the embodiment, an effect of reliably securing the startability of the engine EN within the low temperature range.

Fifth Modification

A controller according to the fifth modification of the embodiment of the present disclosure will be described with reference to FIGS. 11 and 12.

The structure and/or functions of the controller according to the fifth modification are different from those of the controller 1 by the following points. So, the different points will be mainly described hereinafter.

Operations of the controller according to the fifth modification for determination of start of generation of power during startup of the engine EN will be described hereinafter with reference to FIG. 11. In the flowcharts of FIGS. 2 and 11, like operations (steps), to which like reference step numbers are assigned, are omitted or simplified in redundant description.

Specifically, the controller according to the fifth modification is programmed to perform the following operations in steps 600 and 602 between the operations in steps 102 and 104. Thus, the operations in steps 600 and 602 will be fully described hereinafter.

After measurement of the rotation number of the rotor 22M of the power generator 2, the power-generation start/stop circuit 16 calculates an average of measured values of the rotation number of the rotor 22M for each time period T3; the time period T3 is equal to or longer than the expected maximum value of cycle C of pulsations of the engine speed in step 600. The time period T3 can be set to be equal to or different from the time period T used in step 104. Note that, if the execution timing of the operation in step 600 is not a timing to calculate an average of measured values of the rotation number of the rotor 22M, the operation in step 600 is skipped.

Next, the power-generation start/stop circuit 16 determines whether the rate of increase in the calculated average of the rotation number of the rotor 22M for each time period T3 compared with that for the previous time period T3 is equal to or higher than a preset value A in step 602. When determining that the rate of increase in the calculated average of the rotation number of the rotor 22M for the current time period T3 is lower than the preset value A (NO in step 602), the power-generation start/stop circuit 16 shifts to the operation in step 104 and performs the determination in step 104 set forth above.

Otherwise, when determining that the rate of increase in the calculated average of the rotation number of the rotor 22M for each time period T3 is equal to or higher than the preset value A (YES in step 602), the power-generation start/stop circuit 16 immediately shifts to step 108 and instructs the voltage controller 18 to reset the initial excitation mode to shift to the power generation mode in step 108. Thus, the voltage controller 18 operates in the power generation mode to start generation of power by increasing the excitation current to be supplied to the field winding 22 from the initial value up in step 108 set forth above.

Figure 11:
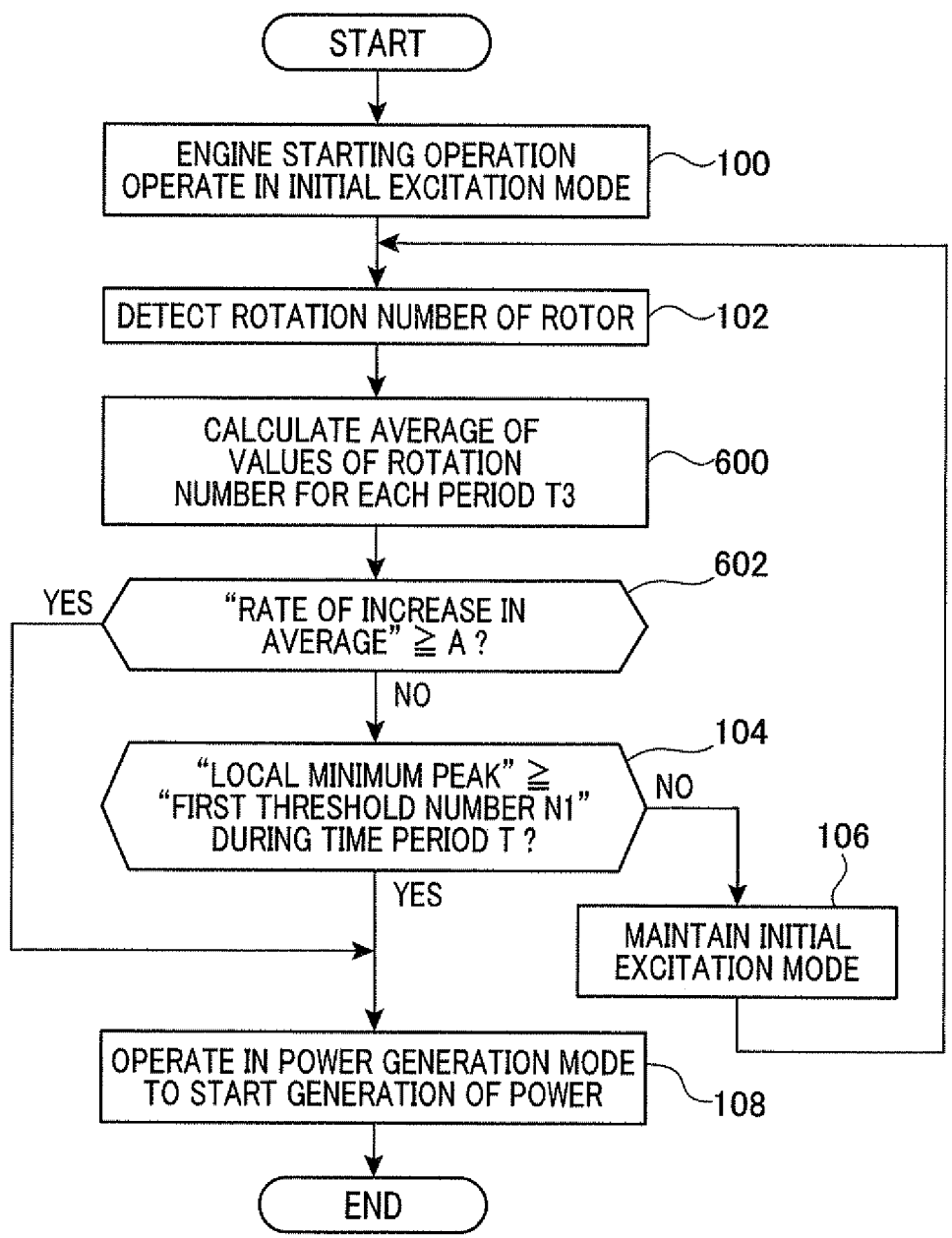
FIG. 11 is a flowchart schematically illustrating the flow of operations to be executed by the controller according to the fifth modification of the embodiment.
Figure 12:
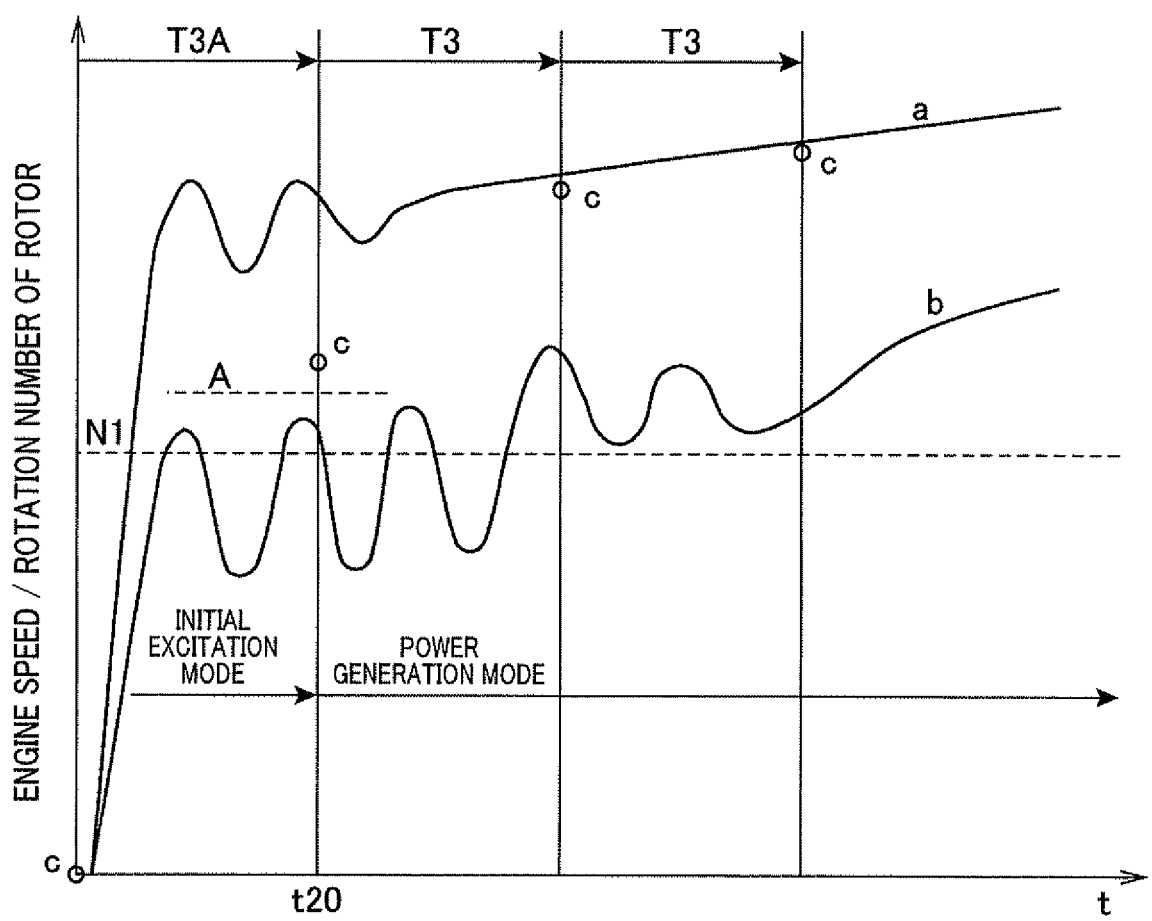
FIG. 12 is a timing chart schematically illustrating operation timings of the controller corresponding to the operations in FIG. 11.

FIG. 12 schematically illustrates operation timings of the controller corresponding to the operations in FIG. 11. In FIG. 12, the graph "a" illustrates the variation of the rotation number of the rotor 22M (the engine speed) within the normal temperature range, and the graph "b" illustrates the variation of the rotation number of the rotor 22M (the engine speed) within the low temperature range. In addition, the dots "c" represents the variation in the averages of the measured values of the rotation number of the rotor 22M (the engine speed) within the normal temperature range.

Referring to FIG. 12, when the rotation number of the rotor 22M of the power generator 2, that is, the engine speed rises immediately within the normal temperature range, the rate of increase in a corresponding average of the measured values of the rotation number of the rotor 22M (the engine speed) for a time period T3A rises at startup of the engine EN to exceed the preset value A. At the timing t20, the controller according to the fifth embodiment is configured to start generation of power.

This configuration makes the start of power generation earlier than a configuration to wait for the lapse of a corresponding time period T after a corresponding minimum peak has exceeded the first threshold value N1. This configuration achieves, in addition to the effects achieved in the embodiment, an effect of accelerating start of generation of power within the normal temperature range while sufficiently securing the startability of the engine EN within the normal temperature range. The operations in steps 600 and 602 can be combined with each of the operations in FIG. 4, the operations in FIG. 6, the operations in FIG. 8, and the operations in FIG. 9.

Sixth Modification

A controller according to the sixth modification of the embodiment of the present disclosure will be described with reference to FIGS. 13 and 14.

The structure and/or functions of the controller according to the sixth modification are different from those of the controller 1 by the following points. So, the different points will be mainly described hereinafter.

Operations of the controller according to the sixth modification for determination of start of generation of power during startup of the engine EN will be described hereinafter with reference to FIG. 13. In the flowcharts of FIGS. 2 and 13, like operations (steps), to which like reference step numbers are assigned, are omitted or simplified in redundant description.

Specifically, the controller according to the sixth modification is programmed to perform the following operations in steps 700 and 702 between the operations in steps 102 and 104. Thus, the operations in steps 700 and 702 will be fully described hereinafter.

After measurement of the rotation number of the rotor 22M of the power generator 2, the power-generation start/stop circuit 16 calculates the rate of increase in the phase voltage, represented by Vp, for each time period T4; the time period T4 is equal to or longer than the expected maximum value of cycle C of pulsations of the engine speed in step 700. The time period T4 can be set to be equal to or different from the time period T used in step 104. Note that, if the execution timing of the operation in step 700 is not a timing to calculate an increase in the phase voltage Vp, the operation in step 700 is skipped.

The power-generation start/stop circuit 16 can use any of the following procedures to calculate the rate of increase in the phase voltage Vp for each time period T4:

The first procedure is to calculate an average of positive peaks or peak-peak values (amplitudes) of the phase voltage Vp for each time period T4, thus calculating the rate of increase in the calculated average for each time period T4 compared with that for the previous time period T4.

The second procedure is to simply calculate the rate of increase in positive peaks or peak-peak values (amplitudes) of the phase voltage Vp from the minimum peak (minimum peak-peak) to the maximum peak (maximum peak-peak) for each time period T4.

Next, the power-generation start/stop circuit 16 determines whether the rate of increase in the phase voltage Vp for current time period T4 is equal to or higher than a preset value B in step 702. When determining that the rate of increase in the phase voltage Vp for current time period T4 is lower than the preset value B (NO in step 702), the power-generation start/stop circuit 16 shifts to the operation in step 104 and performs the determination in step 104 set forth above.

Otherwise, when determining that the phase voltage Vp for current time period T4 is equal to or higher than the preset value B (YES in step 702), the power-generation start/stop circuit 16 immediately shifts to step 108 and instructs the voltage controller 18 to reset the initial excitation mode to shift to the power generation mode in step 108. Thus, the voltage controller 18 operates in the power generation mode to start generation of power by increasing the excitation current to be supplied to the field winding 22 from the initial value up in step 108 set forth above.

Figure 13:
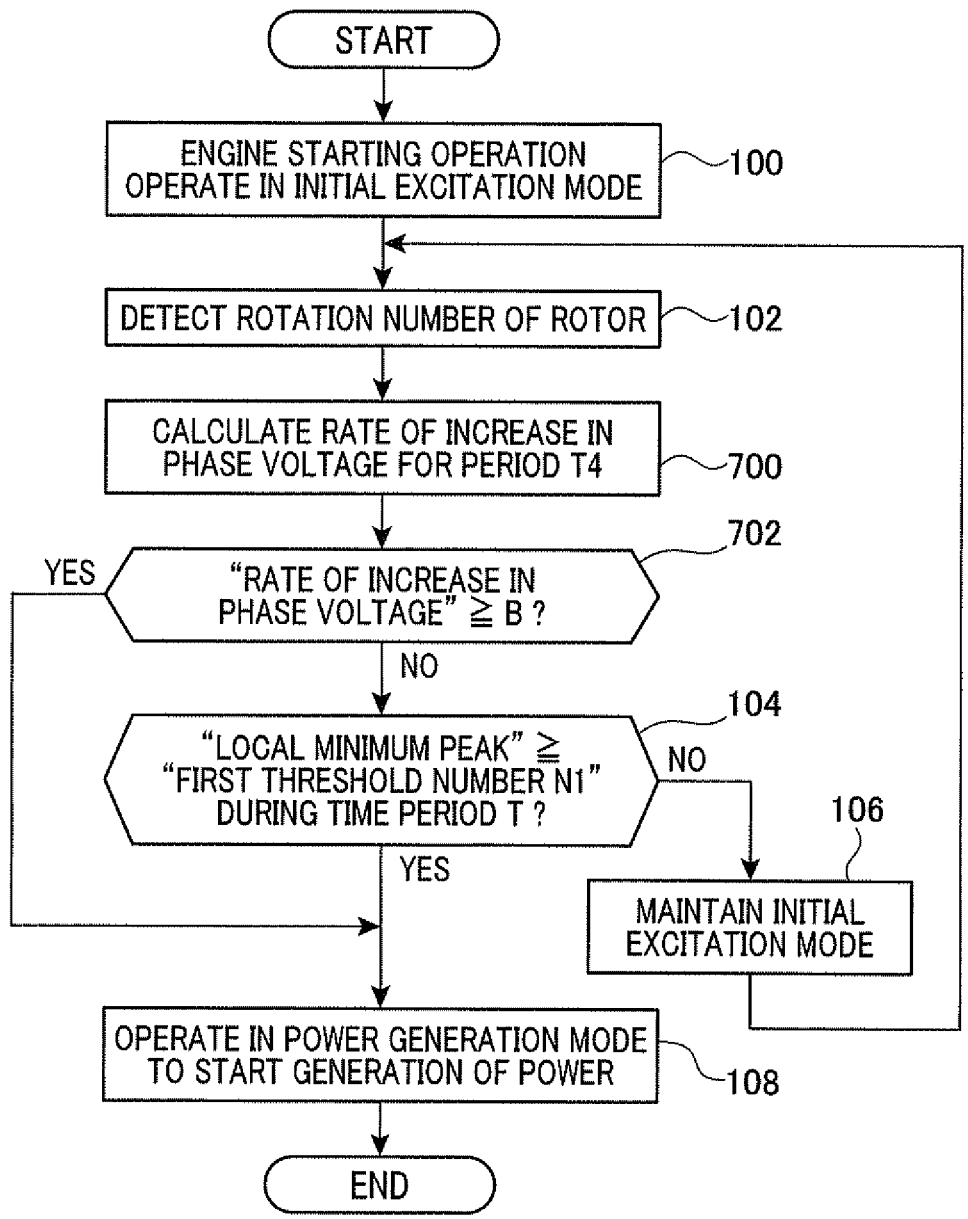
FIG. 13 is a flowchart schematically illustrating the flow of operations to be executed by the controller according to the sixth modification of the embodiment.
Figure 14:
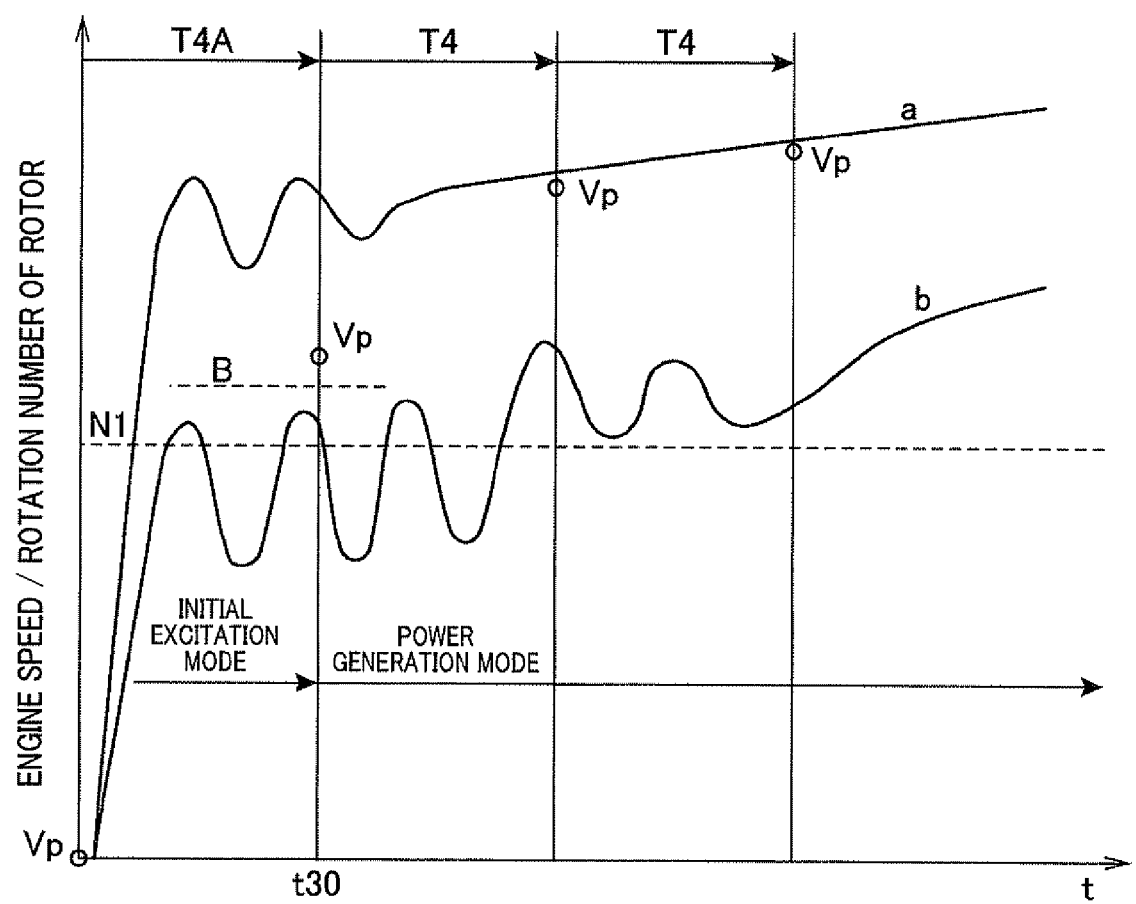
FIG. 14 is a timing chart schematically illustrating operation timings of the controller corresponding to the operations in FIG. 13.

FIG. 14 schematically illustrates operation timings of the controller corresponding to the operations in FIG. 13. In FIG. 14, the graph "a" illustrates the variation of the rotation number of the rotor 22M (the engine speed) within the normal temperature range, and the graph "b" illustrates the variation of the rotation number of the rotor 22M (the engine speed) within the low temperature range. In addition, the dots "Vp" represent the variation in the averages of the phase voltage Vp within the normal temperature range.

Referring to FIG. 14, when the rotation number of the rotor 22M of the power generator 2, that is, the engine speed rises immediately within the normal temperature range, the rate of increase in a corresponding average of the phase voltage Vp for a time period T4A rises at startup of the engine EN to exceed the preset value B. At the timing t30, the controller according to the sixth embodiment is configured to start generation of power.

This configuration makes the start of power generation earlier than a configuration to wait for the lapse of a corresponding time period T after a corresponding minimum peak has exceeded the first threshold value N1. This configuration achieves, in addition to the effects achieved in the embodiment, an effect of accelerating start of generation of power within the normal temperature range while sufficiently securing the startability of the engine EN within the normal temperature range. The operations in steps 700 and 702 can be combined with each of the operations in FIG. 4, the operations in FIG. 6, the operations in FIG. 8, the operations in FIG. 9, and the operations in FIG. 11.

In the power generator 2 according to each of the embodiment and its modifications, three rectifier modules for the filed winding 22 are provided, but an alternative number of rectifier modules for the field winding 22 can be provided. In the power generator 2 according to each of the embodiment and its modifications, a MOS transistor or another type transistor can be provided as each of high-side (upper arm) and low-side (lower arm) rectifier modules.

While the illustrative embodiment and its modifications of the present disclosure have been described herein, the present disclosure is not limited to the embodiment and its modifications described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A controller for controlling a power generator including: a rotor with a field winding; and at least one-phase stator winding, the rotor being rotatable by rotational power supplied from an engine, the controller comprising:
   a switch connected with the field winding;
   a voltage controller configured to operate, in an initial excitation mode, to turn selectively on and off the switch to supply an excitation current as an initial excitation current to the field winding, and operate, in a power generation mode, to selectively increase and reduce the excitation current to be supplied to the field winding to regulate an output voltage of the power generator to a target value;
   a rotation-number measuring unit configured to measure a rotation number of the rotor based on a phase voltage induced in the at least one-phase winding; and
   a mode-shift determiner configured to, while the voltage controller operates in the initial excitation mode, determine whether to shift an operation mode of the voltage controller from the initial excitation mode to the power generation mode based on: the measured rotation number of the rotor, a threshold rotation number of the rotor, and a preset time period, the time period being equal to or longer than an expected maximum value of cycle of pulsations of rotation of the engine.

2. The controller according to claim 1, wherein the mode-shift determiner is configured to determine the shift of the operation mode of the voltage controller from the initial excitation mode to the power generation mode when a local minimum value of the measured rotation number of the rotor is equal to or higher than the threshold rotation number during the time period.

3. The controller according to claim 2, wherein the rotation-number measuring unit is configured to measure the rotation number of the rotor based on each period of the phase voltage, and the mode-shift determiner is configured to determine the shift of the operation mode of the voltage controller from the initial excitation mode to the power generation mode when the measured rotation number of the rotor is equal to or higher than the threshold rotation number during the time period.

4. The controller according to claim 2, wherein the mode-shift determiner is configured to set the preset time period to a first value when an ambient temperature of the engine is equal to or lower than a threshold temperature, and set the time period to a second value lower than the first value when the ambient temperature of the engine is higher than the threshold temperature.

5. The controller according to claim 2, wherein the mode-shift determiner is configured to reduce the time period when the measured rotation number reaches a second threshold number, the second threshold number being higher than the threshold number as a first threshold number.

6. The controller according to claim 1, wherein the rotation-number measuring unit is configured to measure the rotation number of the rotor based on each period of the phase voltage, and the mode-shift determiner is configured to determine the shift of the operation mode of the voltage controller from the initial excitation mode to the power generation mode when the measured rotation number of the rotor is equal to or higher than the threshold rotation number over a number of continuous periods of the phase voltage, the number of continuous periods of the phase voltage corresponding to the time period.

7. The controller according to claim 6, wherein the mode-shift determiner is configured to set the number of continuous periods of the phase voltage to a first value when an ambient temperature of the engine is equal to or lower than a threshold temperature, and set the number of continuous periods of the phase voltage to a second value lower than the first value when the ambient temperature of the engine is higher than the threshold temperature.

8. The controller according to claim 6, wherein the mode-shift determiner is configured to reduce the number of continuous periods of the phase voltage when the measured rotation number reaches a second threshold number, the second threshold number being higher than the threshold number as a first threshold number.

9. The controller according to claim 6, wherein the number of continuous periods of the phase voltage is set to be higher than a number of periods of the phase voltage corresponding to intervals of explosions of air-fuel mixture in the engine.

10. The controller according to claim 1, wherein the mode-shift determiner is configured to set the threshold rotation number to a first threshold number when an ambient temperature of the engine is equal to or lower than a threshold temperature, and set the threshold rotation number to a second threshold number lower than the first threshold number when the ambient temperature of the engine is higher than the threshold temperature.

11. The controller according to claim 2, wherein the mode-shift determiner is configured to determine the shift of the operation mode of the voltage controller from the initial excitation mode to the power generation mode when a rate of increase in averages of the measured rotation number of the rotor is equal to or higher than a preset value.

12. The controller according to claim 6, wherein the mode-shift determiner is configured to determine the shift of the operation mode of the voltage controller from the initial excitation mode to the power generation mode when a rate of increase in averages of the measured rotation number of the rotor is equal to or higher than a preset value.

13. The controller according to claim 2, wherein the mode-shift determiner is configured to determine the shift of the operation mode of the voltage controller from the initial excitation mode to the power generation mode when a rate of increase in the phase voltage is equal to or higher than a preset value.

14. The controller according to claim 6, wherein the mode-shift determiner is configured to determine the shift of the operation mode of the voltage controller from the initial excitation mode to the power generation mode when a rate of increase in the phase voltage is equal to or higher than a preset value.

* * * * *